Aug. 25, 1936.  L. H. PLATT  2,052,001

MACHINE FOR WASHING AND GRADING VEGETABLES, FRUITS OR THE LIKE

Filed Feb. 17, 1936  5 Sheets-Sheet 1

Inventor
Leland H. Platt.

Attorney.

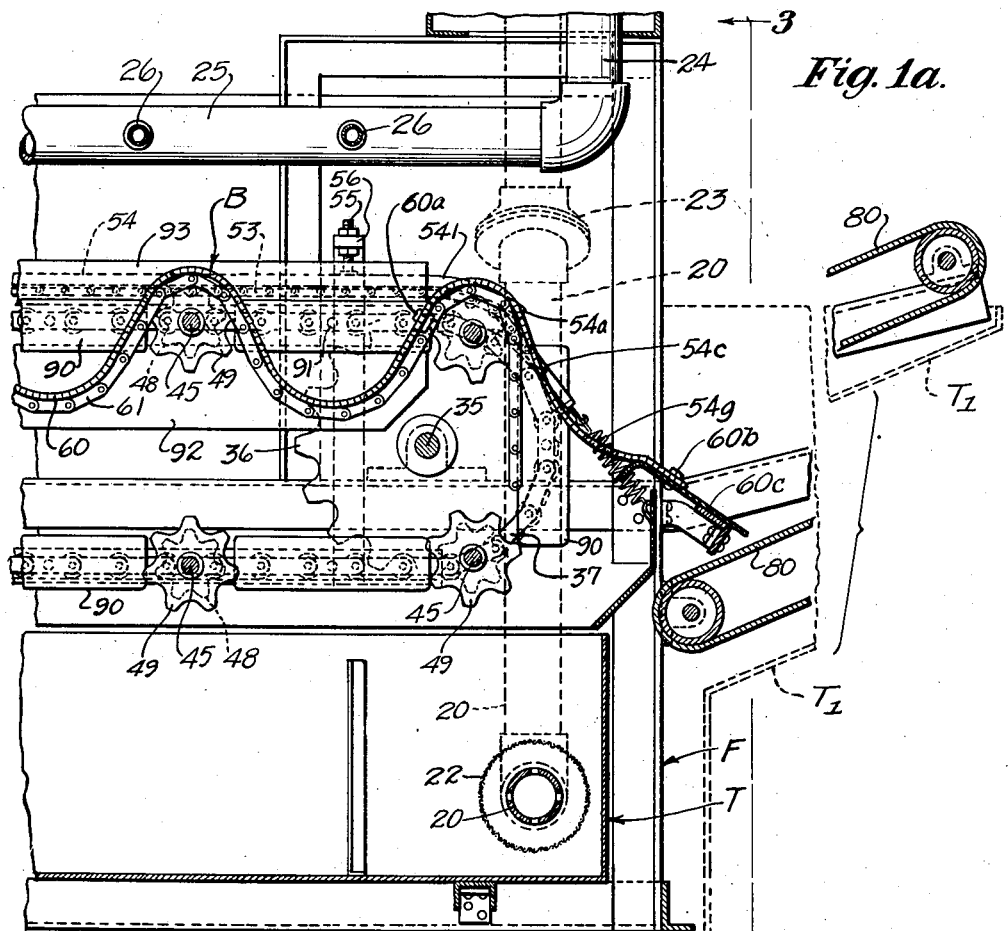

Aug. 25, 1936.  L. H. PLATT  2,052,001
MACHINE FOR WASHING AND GRADING VEGETABLES, FRUITS OR THE LIKE
Filed Feb. 17, 1936    5 Sheets-Sheet 3
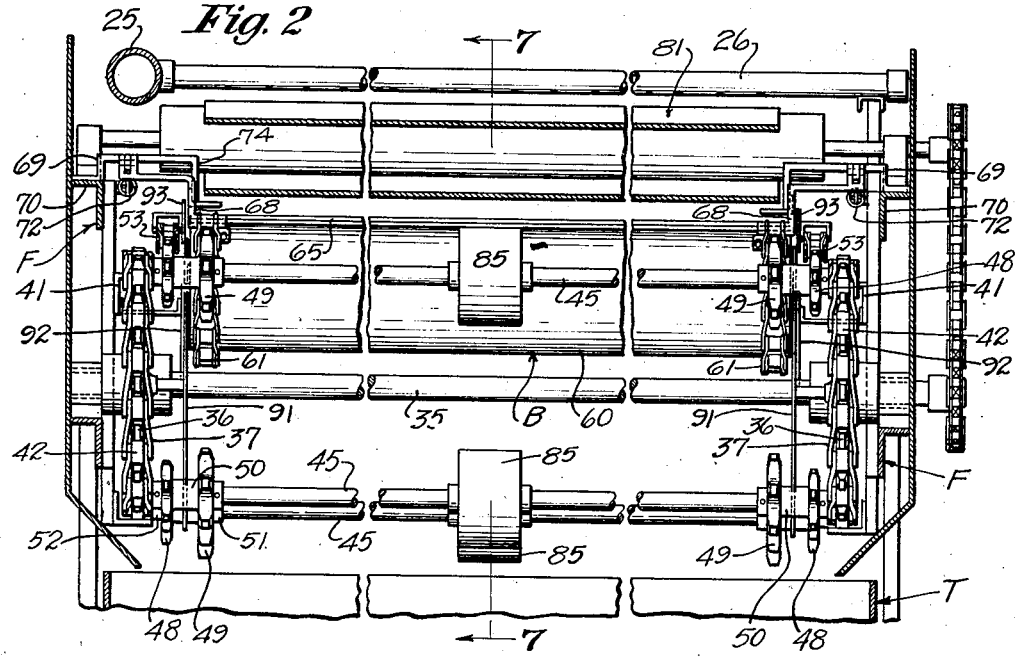
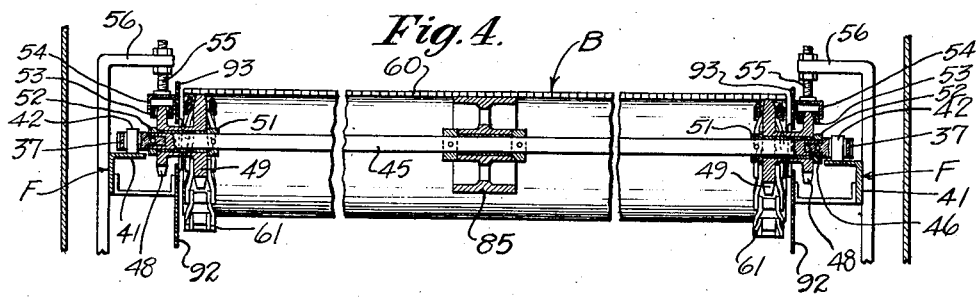
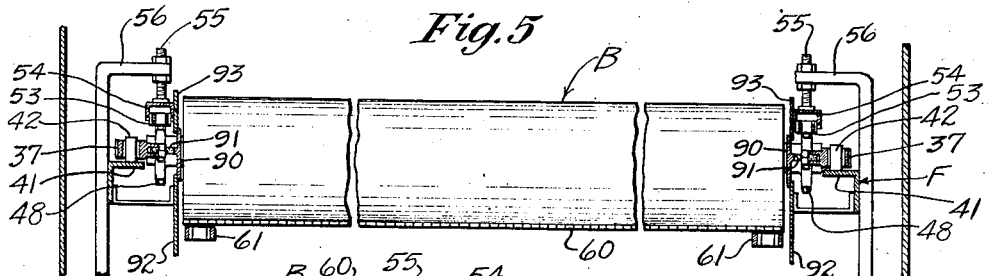
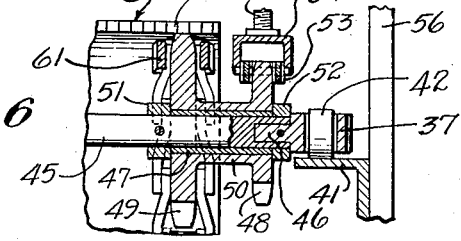
Inventor
Leland H. Platt.
Attorney.

Aug. 25, 1936.  L. H. PLATT  2,052,001
MACHINE FOR WASHING AND GRADING VEGETABLES, FRUITS OR THE LIKE
Filed Feb. 17, 1936  5 Sheets-Sheet 4

Inventor
Leland H. Platt.
Attorney

Aug. 25, 1936. L. H. PLATT 2,052,001
MACHINE FOR WASHING AND GRADING VEGETABLES, FRUITS OR THE LIKE
Filed Feb. 17, 1936 5 Sheets-Sheet 5
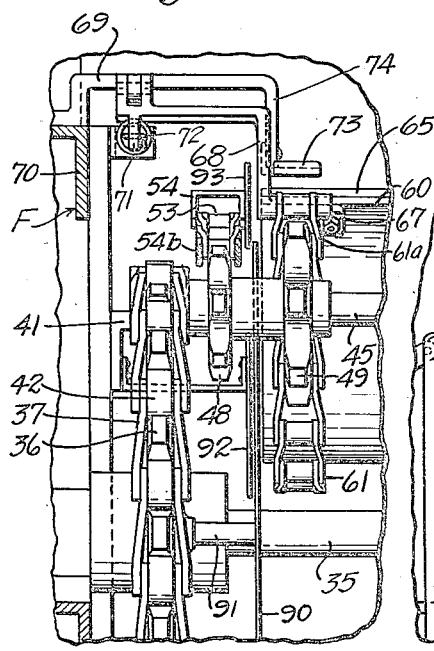
Fig. 13.
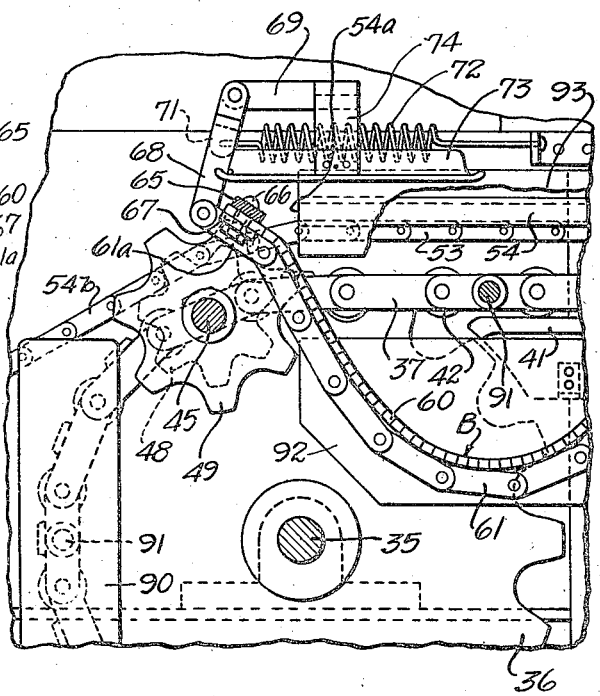
Fig. 12.
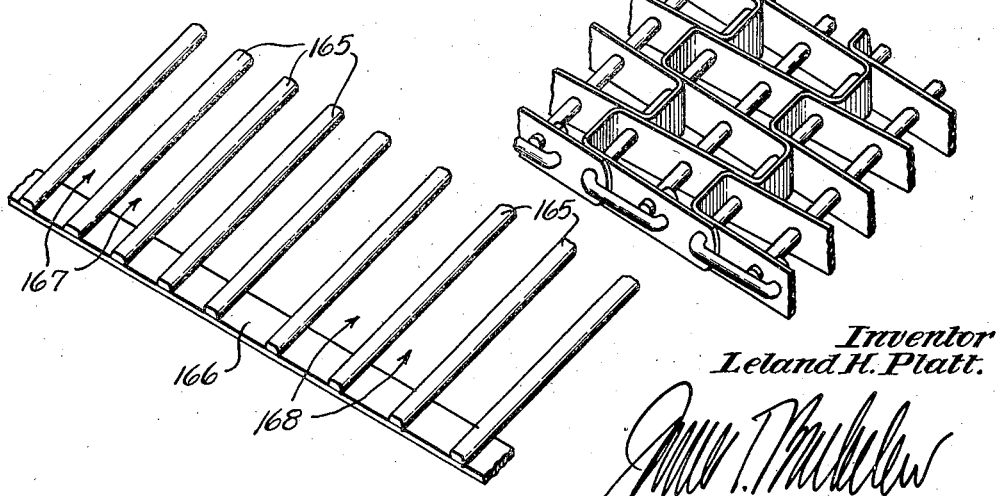
Fig. 11.
Fig. 10.
Inventor
Leland H. Platt.
Attorney.

Patented Aug. 25, 1936

2,052,001

UNITED STATES PATENT OFFICE 2,052,001

MACHINE FOR WASHING AND GRADING VEGETABLES, FRUITS OR THE LIKE

Leland H. Platt, Los Angeles, Calif.

Application February 17, 1936, Serial No. 64,303

22 Claims. (Cl. 146—194)

This invention relates to machines of the same general type and purpose as that described in my application of the same title, Ser. No. 31,191, filed July 13, 1935; and the present invention may, in some of its aspects, be regarded as an improvement upon machines of the type shown in my said pending application.

In said application I show and describe a machine wherein vegetables, fruit or the like, are carried through the machine on a flexible belt, motion of the produce along the belt being induced by a longitudinal wave action set up in the belt. In that disclosure, among other things, I have described a mechanism for producing the wave action, comprising a series of longitudinally travelling rolls, one set above and the other set below the belt. Longitudinal travel of those rolls above and below the belt, causes a series of wave crests and depressions to travel longitudinally through the belt; and the produce, having been deposited in a depression, is carried along with that depression through the machine.

The present invention, although embodying several other improvements which will be hereinafter explained, is directed first to the production of an improved form of wave creating mechanism. In this improved form of mechanism, instead of employing rolls or the like alternately above and below the belt to create the longitudinally travelling crests and troughs, I now support the belt only at the travelling crest. The belt is allowed to hang between successive crests; and, to maintain the troughs uniform and equal, the belt is fed rearwardly with relation to each travelling crest at the proper relative speed to maintain troughs of predetermined depth.

To perform the above described operation, I employ a series of members which may be broadly termed travelling belt-driving or actuating rolls. These travelling rolls extend transversely between, and are carried by a pair of endless belts, preferably chains; and they form the spaced travelling supports for the travelling crests of the belt. As the rolls travel forward, they are rotated in a rearward direction, so that as the rolls travel forward the belt is driven relatively rearwardly at a linear speed greater than that of the forward roll travel. The ratio of those two speeds determines the excess length of belt which is fed into and maintained in the hanging trough between two successive crests.

As an illustration of a typical practical form of my invention, I find it desirable to make the crest supporting rolls in the form of, or to include, a belt feeding sprocket or sprockets; and to provide the belt with corresponding chains with which these sprockets mesh so that the belt may be positively and accurately moved at a predetermined relative velocity. Also, in order to rotate these sprocket rolls accurately at the chosen velocity, I chose to use a form of rack and gear which, for purposes of simplicity and inexpensiveness, takes the form of a rack composed of standard sprocket chain and a sprocket arrangement for bringing the sprockets into mesh at the beginning of each run.

The foregoing, and other improved and advantageous features will now best appear from the following detailed and specific description of preferred and illustrative forms of my invention, reference for this purpose being had to the accompanying drawings, in which:

Fig. 1a is a similar view of the discharge end of the machine; Figs. 1 and 1a together constituting a substantially complete vertical longitudinal section of the machine except that a portion of its length is cut out in the break between the two figures;

Fig. 2 is an end view, partly in elevation and partly in section, taken as indicated by line 2—2 on Fig. 1;

Fig. 3 is an end elevation of the machine, taken as indicated by line 3—3 on Fig. 1a;

Figure 1:
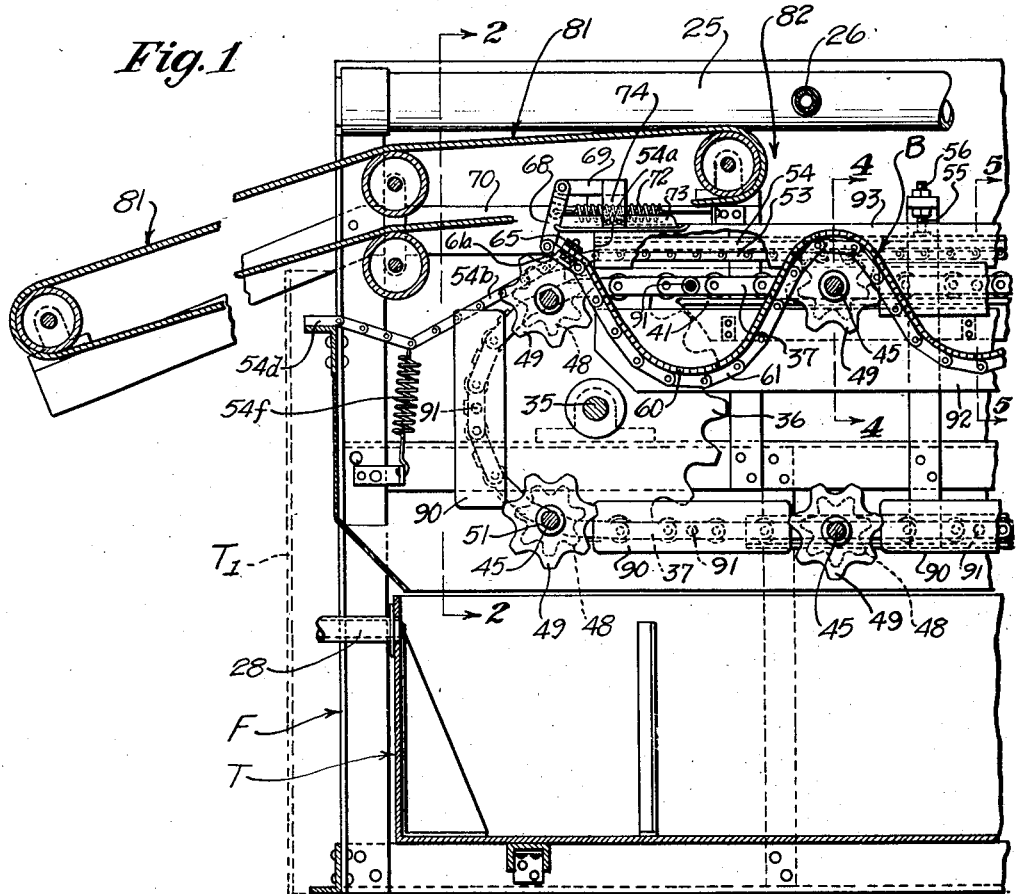
Fig. 1 is a fragmentary longitudinal vertical section of the feed end of the machine.
Figure 8:
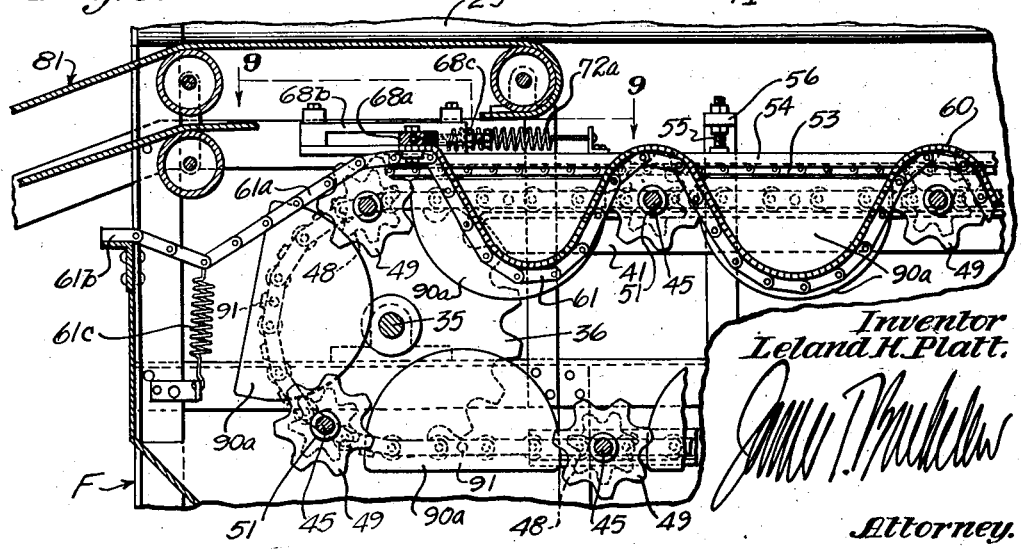
Figure 3:
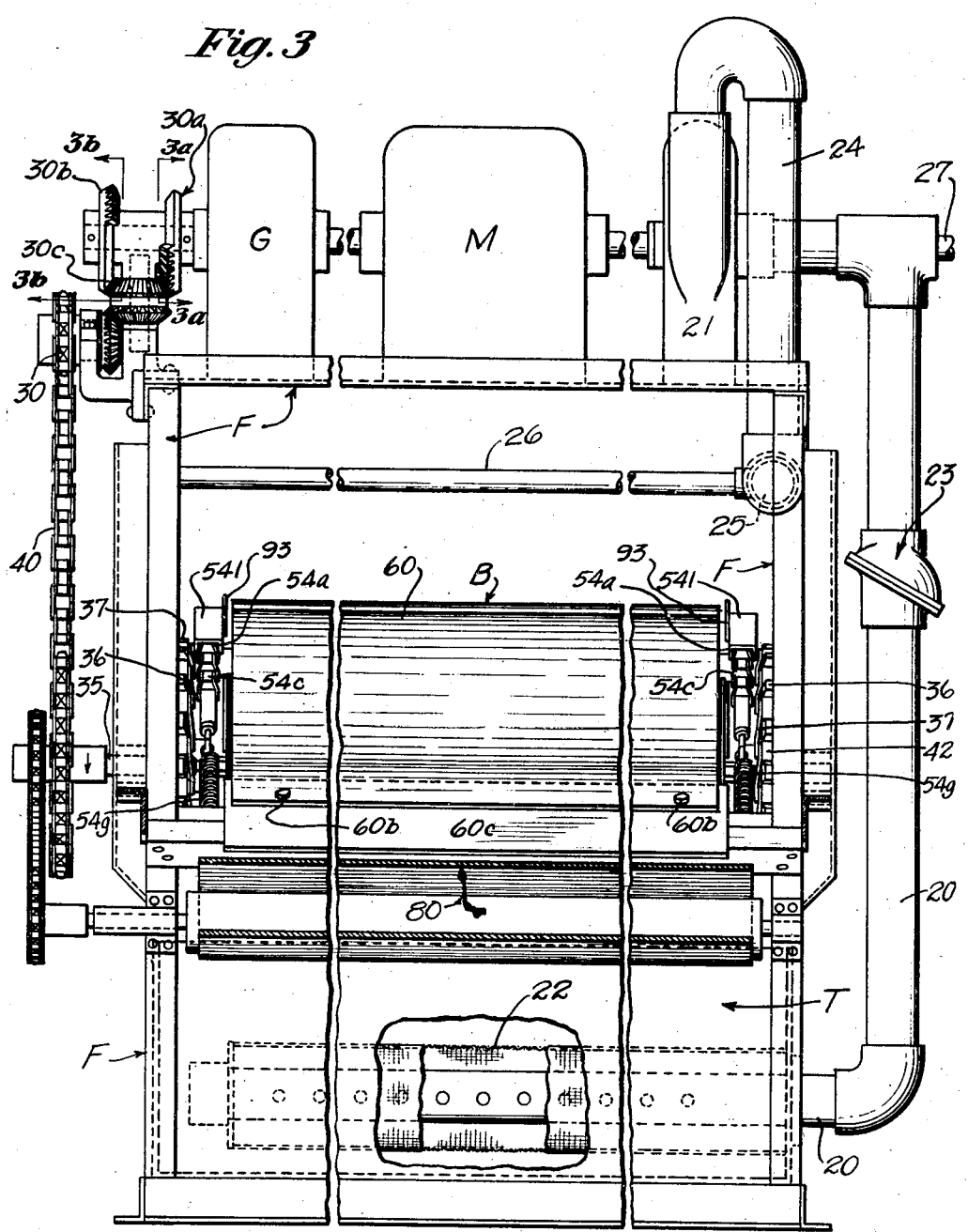
Figure 3B:
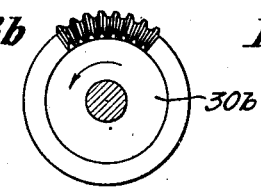
Figure 3A:
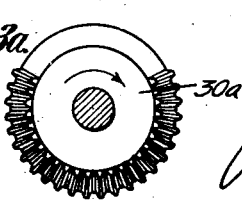

Figs. 3a and 3b are detail views of certain driving gears, taken as indicated by lines 3a—3a and 3b—3b, on Fig. 3;

Figs. 4 and 5 are respectively detail sections taken as indicated by lines 4—4 and 5—5 on Fig. 1;

Fig. 6 is a fragmentary enlargement of portions of Fig. 4;

Fig. 7 is a fragmentary central longitudinal section taken on the line 7—7 of Fig. 2;

Fig. 8 is a vertical longitudinal section similar in aspect to Fig. 1, but fragmentary, showing a modified design of machine;

Fig. 9 is a fragmentary detail plan section taken as indicated by line 9—9 on Fig. 8;

Fig. 10 is a fragmentary perspective of a typical form of belt;

Fig. 11 is a similar view showing a typical belt for grading operations;

Fig. 12 is a fragmentary enlargement of certain portions of Fig. 1; and

Fig. 13 is an enlargement from Fig. 2 of the parts shown in Fig. 12.

The typical machine herein disclosed as an illustrative embodiment of the invention, will be described as a fruit and vegetable washing machine. After a detailed understanding of the mechanism as used as a washing machine, its application to other features, such as graders or sorters, will be easily understood.

The frame work F of the machine as here illustrated needs no especial consideration or description except as the certain details to which attention will be later drawn. This frame work F carries the various operating parts of the machine and, for washing, carries in its lower portion the overflow tank or tanks T. These tanks take the washing drainage; and from the tanks the liquid is drawn through the suction pipe 20 into the circulating pump 21. (See Fig. 3 particularly for the parts now being described.) The intake end of pipe 20, within tank T, is screened, as shown at 22, and the riser 20 may be provided with an upwardly opening check valve 23. Pump 21 delivers the liquid circulation into an outflow pipe 24 from which it flows to header 25 and thence into and through the several perforated laterals 26 which deliver a flow or spray of washing liquids over the produce as it is carried through the machine on the belt mechanism. After coming into contact with the produce, the liquid then drains back into the tanks T for recirculation. In order to keep the washing liquid fresh a suitable amount of fresh liquid, over and above the losses, may be continuously introduced to the circulating system at 27, and a corresponding amount allowed to escape at the overflow 28 from tank T.

In a preferred arrangement of the parts, the circulating pump 21 is mounted on top the frame work F and is driven directly by motor M. This motor M also drives a sprocket 30 through the intervention of a reducing gear contained in the case illustrated at G. From sprocket 30 the belt mechanisms and discharge conveyor are driven.

In the frame work F there are journalled two transverse shafts 35, each of which carries two large sprocket wheels 36 arranged, on each shaft, near opposite sides of the machine. Over each pair of sprocket wheels 36 an endless chain 37 is propelled continuously. In the machine as shown in the drawings, the shaft 35 shown at the right in Fig. 1a constitutes the main drive shaft of the mechanism; and this shaft 35, as shown in Fig. 3, is driven by chain 40 from the motor driven sprocket 30. The drive is in such a direction that the upper run of each of the chains 37 travels toward the right in Figs. 1 and 1a. These upper runs, as best can be seen in Figs. 4 and 5, travel longitudinally on and supported by ways that are formed in the frame work by the angle irons 41; so that the chains during their upper runs are supported to travel in straight horizontal lines. Preferably these chains are of the roller variety, their rollers 42 forming anti-friction bearings for the chains on the ways.

Carried by these two chains 37, and extending transversely between them across the machine, is a series of equally spaced shafts 45 which carry the members heretofore referred to as the belt actuating rolls, specifically in the form of sprocketc. Figs. 2 to 6, inclusive, best show the mounting and arrangement of these shafts and sprocket rolls. As is best shown in detail in Fig. 6, each end of each shaft 45 is mounted upon a stud or pin 46 which is carried by or formed integrally with a link of chain 37. It is immaterial whether the shafts 45 rotate on the pins 46; preferably the pin 46 is not intended to be used as a bearing, and preferably the shafts 45 are rotatively stationary. Each shaft 45, at each end, just inside the carrier chain 37, has a bearing sleeve 47; and on this bearing sleeve 47 a pair of interconnected sprockets 48 and 49 are adapted to rotate. In practice these two sprockets 48 and 49 may be cast or formed integrally with an interconnecting hub 50; and the sprockets are longitudinally fixed between collars 51 and 52.

The smaller one of these sprockets 48, may be termed a sprocket gear. It travels, during the upper run toward the right in Figs. 1 and 1a, in mesh with a rack formed by a sprocket chain 53 which is welded or otherwise secured to the under side of a longitudinal member 54. This longitudinal member 54 does not form directly a part of the relatively fixed frame, but is preferably adjustable vertically by means of the hanger bolts 55 which depend from frame brackets 56.

It is one of the advantages of my machine that is can be and preferably is made up of relatively inexpensive stock parts. The chains and sprockets may all be, with perhaps the exception of the pairs of sprockets 48, 49, merely selected from stock manufacture; and it is not necessary that they be of precision manufacture at all. Thus, using a rough stock chain 53 to perform the function of a gear rack, I find it convenient to so mount that gear rack that it can be adjusted vertically to obtain proper mesh with the sprockets 48 travelling underneath it.

The racks, constructed as so described, extend longitudinally through the machine co-extensive with the longitudinal members 54. The ends of the rack proper can be seen plainly in Figs. 1 and 1a, labeled 54a. Beyond the ends of the rack formation at 54a the chains 53 extend further as flexible chains, as indicated in Figs. 1 and 1a at 54b and 54c. The outer ends of these extending chain portions 54b and 54c are flexibly anchored. For instance, at the intake end of the machine the final ends of the chains are anchored at 54d, the springs 54f keep the chains under yielding tension and in a normal position extending somewhat downwardly and outwardly from the rack end 54a. At the outlet or discharge end of the machine the rack is curved downwardly slightly, as at 54l, before reaching its end at 54a; and the chain extensions 54c are shown merely as being held in yielding tension by tension springs 54g. The purpose of these flexible chain extensions, under yielding tension, is to provide a simple and inexpensive arrangement for causing the sprockets 48 to move smoothly into and out of rack mesh as the machine is in operation, and to cause proper initiation and final termination of the wave formation in the belt. As regards the latter, it may be noted that if the sprockets left off their rack engagement upon reaching such a position as that shown in Fig. 1a, the belt trough immediately to the left (the trough that is approaching the belt end) would immediately become uncontrolled while the specified sprocket would still be supporting a crest beyond it. The result would be a somewhat uncontrolled delivery of the produce from the belt.

The belt B may be constructed in any suitable manner, and composed of any suitable elements conforming to the functions to be performed. As here illustrated belt B is made up of a flexible belt member 60 and two sprocket chains 61 located on its under side at or near its longitudinal edges. The belt member 60 may be composed of any suitable material or structure, there being a wide variety of choice. For the functioning of the machine, it is only necessary that the belt be flexible in a longitudinal direction. Its material, its surface characteristics, whether or not it is perforate, etc. are matters of choice to suit particular uses to which the machine may be put. As a simple and inexpensive belt for washing purposes, I have selected, and illustrate here, a foraminous metal structure of the type used for metal floor mats. These are flexible longitudinally, relatively stiff in a transverse direction, have a mesh of about the right size for supporting most fruits and vegetables, and are sufficiently open in their structures to allow wash water to pass freely through them. Fig. 10 is a fragmentary view illustrating the structure of such a belt.

For grading purposes, it is only necessary that the openings through the belt be made of progressively increasing sizes, proceeding from the intake to the discharge end of the belt. It is unnecessary here to describe in detail all of the various types of belt members that may be used; but for the purposes indicated a general type that enables the machine to operate as a grader is shown in Fig. 11, comprising a belt member made up of transverse slats 165 mounted at their ends on flexible edge strips 166. It is indicated how the openings between the slats may be narrower as at 167, or wider as at 168.

However the belt may be made up in structural detail, it will preferably include, at its longitudinal edges, a flexible rack preferably in the form of the chains 61; and the belt member 60 will be secured to these chains in such manner as to hold the belt member and chains together as a flexible unit.

The flexible belt B is supported in the machine only by the roll sprockets 49 and by a special supporting device for the head or intake end of the belt. It will be noted, in Figs. 2 to 6, how the belt chains 61 are located in such a position as to be in longitudinal alinement with the roll sprockets 49; so that, as the roll sprockets 49 are carried forwardly through the machines, they will travel under the belt chains 61, supporting those chains and the belt at spaced intervals.

Although any suitable mounting and support for the head end of the belt may be used, a typical one is as follows: Across the head end of the belt member 60 I provide a stiffening bar 65; and, at each edge of the belt member, this bar and the belt member is secured by bolts 66 to lugs 67 on the endmost link 61a of the belt chains 61. This construction makes a rigid tie across the head end of the belt and at that point rigidly connects the belt member 60 with the two belt chains. The two end links 61a are hung on suspension links 68, pivoted at their upper end to brackets 69 mounted on frame members 70. Figures 12 and 13 show these features in enlargement and more clearly than does Fig. 1. Connected with the pivoted suspension links 68 are arms 71 to which tension springs 72 are connected, the tension springs tending to move the suspension links 68 and therefore the head end of the belt, toward the right in Figs. 1 and 12. A limit is placed upon this movement toward the right by any suitable means, as by the links 68 coming into contact with the ends of shoes 73. These shoes 73, supported on a bracket 74, are in a position overlying the edge of the belt at or near its head end, to keep the belt just behind its head end from flapping up off the sprockets 49 when they first come into engagement with it.

It will be noted from the drawings that the pitch diameter of roll sprockets 49 is greater than the pitch diameter of roll sprockets 48. In the specific construction and design here illustrated, the two sprockets of each pair have equal numbers of teeth, so that the pitch of belt chain 61 is correspondingly greater than the pitch of rack chain 53. However, the only essential is that the pitch diameter of the roll sprocket 49 be greater than the pitch diameter of the roll sprocket 48.

The functions and operation of the mechanism can now be readily understood. Consider that the carrier chains 37 are in constant movement, their upper runs moving toward the right in Figs. 1, 1a and 12. Consider the action of the rolls (sprockets) on any one of the shafts 45. As these are carried around by the movement of carrier chains 37, the sprockets 48 are first carried upwardly into engagement with the chains 54b which forms the head extensions of the racks 53. The sprockets may come first into contact with these chain extensions in any random position. They make such initial contact at a position somewhat to the left of the position shown in Fig. 12. If the sprocket teeth do not immediately mesh with the chains, the yielding tensional support of the chains 54b allows the chains to give and temporarily ride the sprockets until the sprockets slip into mesh. Ordinarily the sprockets will so slip into mesh substantially immediately, and in practice always before the sprockets have reached substantially the position shown in Fig. 12.

Sprockets 48, being thus in mesh by the time the position of Fig. 12 has been reached, the teeth on the interconnected sprockets 49 are then in such relative positions as substantially to register with belt chains 61 for meshing. The ends of these chains are supported approximately in such meshing position by the supporting means just previously described; and the springs 72 of that supporting means allow such small movements of the belt chains as may in practice be necessary to allow the chains to mesh with the sprockets 49. And thus, upon reaching approximately the position shown in Fig. 12, the two sets of sprockets 48 and 49 are both in mesh with their corresponding chains.

As the set of roll sprockets proceeds through the machine to the right, each set of sprockets is rotated in a counter-clockwise direction at a certain rotational speed which depends, for any given forward velocity of carrying chains 37, upon the pitch diameter of sprockets 48. Sprockets 49 being of pitch diameter greater than that of sprockets 48, move the belt chains 61 toward the head end of the machine faster than the sprocket rolls are moving toward the discharge end of the machine. Consequently for any given lineal travel of the sprocket rolls toward the discharge end of the machine, the belt chains 61, and the belt, are fed past the sprockets toward the head end of the machine a greater lineal distance, and the proportionate difference between those two lineal travels is the same as the proportionate difference between the pitch diameters of the two sprocket rolls 48 and 49.

Thus, each succeeding set of sprocket rolls, as it comes into meshing engagement with the rack and with the belt chains, not only supports a wave crest in the belt at proper spaced relation to the preceding and succeeding sprocket rolls, but also feeds the belt toward the head end of the machine at a predetermined rate that will at all times maintain between any two successive sprocket rolls a surplus length of belt which, hanging under its own weight, forms a trough. The result is that, due to the supporting and feeding actions of the sprocket rolls, a series of uniform travelling waves traverses the belt from head end to discharge end of the machine.

The feeding action of sprockets 49 on the belt begins, of course, as soon as the sprockets are engaged in mesh, as at the position of Fig. 12. At this initial position the head end of the belt has to then move toward the left temporarily, until there is a sufficient length of belt to the left of the sprockets to form the beginning of a trough. The spring yielding mounting, previously described, allows such temporary movement of the head end of the belt, toward the left, the springs bringing the parts back to normal position as soon as the sprockets have moved far enough to the right that the length of belt to the left of the sprockets can sag.

Near the discharge end of the machine, the belt member 60 is again affixed, at the point designated 60a, to the chains 61. From that point on to their ends, the chains 61 hang loosely without attachment to belt member 60, and the end of the belt member 60 is attached at 60b to an apron 60c over which the produce moves as it is discharged at the end of the belt, onto any suitable discharge conveyer 80. The belt member 60 is preferably heavy enough and flexible enough to hang of its own weight into the trough formations between the crests which are supported by the succeeding sprocket rolls; as are also the chains 61. The belt member and chains are preferably not connected together throughout their lengths, but only at spaced points such as at the head ends of the belt and near the tail end at 60a. Such interconnection is sufficient to prevent the chains and the belt member from creeping longitudinally relatively to each other, and at the same time allows those members to have the localized relative longitudinal movement that is necessary for the convex and concave bends in the belt.

The produce, or any other material or object to be acted upon, is delivered onto the belt at a point far enough from its head end as always to drop into a travelling trough. For instance, a feed conveyer 81 is illustrated discharging at 82 onto the belt. The objects thus delivered onto the belt, whatever they may be, are carried along in the troughs; and, as the belt surface itself is longitudinally stationary while the wave formation travels, the articles, if they are at all capable of rolling, are rolled over and over in following along with the troughs. As a consequence the articles are thoroughly exposed to a washing spray or to any other superficial treatment.

I have referred to the sprockets 48 and 49 as being sprocket rolls, because functionally they act as rolls of different diameters. As will be readily understood, smooth-faced friction rolls, having frictional rolling contacts with a rail substituted for rack 53 and with the under-surface of a smooth belt, would have the same action as is here described. From a practical standpoint, however, the use of meshing elements, involving gear or sprocket rolls, is preferred, as there is no liability of uncontrolled slipping taking place.

Some belt members 60 may not be sufficiently stiff in a transverse direction to support their own weights and the weight of the material being treated; and in that case, suitable additional supports may be placed on the shafts 45. For instance, at the center of each shaft 45 I have shown a loosely rotatable roller 85. To start that roller 85 into rotation just before it comes into supporting contact with the belt, a flexible wiper arm 86 may be provided as shown particularly in Fig. 7. Rollers 85 move upwardly under this wiper arm 86 just before coming into contact with the belt, and, by engagement with the wiper arm, are set into counter-clockwise rotation before contacting the belt.

In order to close the ends of the travelling troughs, the carrier chains 37 may carry suitable closure plates, properly positioned between the successive sets of sprocket rolls, so as to form end closures for the troughs. In the machine as shown in the figures so far described, these closure plates 90, carried at mounting points 91 on the chains 37, are not intended to close entirely the ends of the troughs, but only so much of the ends as cannot be conveniently closed by stationary plates. Thus, in these figures, I show a pair of longitudinally extending stationary plates 92 mounted on the frame of the machine and of such size and position as effectively to close the lower parts of the trough ends. The upper edges of these closure plates 92 are in such a position that the shafts 45 and the hub 50 of the sprocket rolls will pass over them. The lower edges of the travelling closure plates 90 overlap the upper edges of stationary plates 92, as is best shown in Figs. 4 and 5. Above the travelling closure plates 90, there are stationary closure plates 93, mounted on and carried by longitudinal members 54 that carry the rack chains 53. The upper edges of the travelling plates 90 overlap the lower edges of these stationary plates 93.

In Figs. 8 and 9 I have illustrated certain modifications which I will now describe, the machine shown in this figure being largely the same as before described. In these figures the rack chain 53 terminates at the end of the longitudinal member 54 that carries the rack, there being no head extension 54b of this chain as shown in Fig. 1. Instead, there is an extension 61a of the belt chain 61, the end of this extension being anchored at 61b and the extension being put under yielding tension by spring 61c. The head end of the belt is mounted on a slide bar 68a, sliding in guides 68b; and a spring 72a provides for a certain amount of change of position at the head end of the belt for the same purposes as before described. Spring 72a is, in effect, stronger than spring 61c so that normally spring 72a holds the sprocket chains in the position shown in Fig. 8 and returns them to that position after temporary movement toward the left.

In this modified form of the device, it is the larger sprocket 49 that first comes up into contact and mesh with extension chain 61a; and, this sprocket having meshed with the extension of the belt chain by the time the sprocket reaches the position shown in the upper left hand portion of Fig. 8, the smaller sprocket 48 is then in such a position as to come into mesh with the rack chain 52. Or, if the sprockets are not thus accurately in meshing position, the flexibility of position of the belt chain at the head of the belt allows the sprockets 48 the necessary latitude of relative position to insure their meshing with the racks 53. Adjusting screws 68c, behind the cross bars 68a serve to adjust the limiting position of the cross bar and of the chains 61.

Also in Fig. 8 I have shown an arrangement of end closures which is somewhat different from that of the previous figures, mainly in utilizing travelling closure plates of larger size and eliminating the lower stationary plates 92. As shown in Fig. 8 these larger travelling plates 90a are substantially large enough to cover and close the major portion of the otherwise open ends of the troughs. Like the smaller plates 90 shown in Fig. 1, these travelling plates are mounted on the carrier chains 37 at the mounting points 91. Their larger size eliminates the necessity of using the lower stationary closure plate 92 of Figs. 1, etc.; and these larger travelling plate 90a may either be used alone to close the ends of the troughs, or used in conjunction with the upper stationary end closure plates 93, like in Figs. 1 etc.

The typical forms of mechanism that I have described may be used in various manners and for various purposes. I have indicated, for instance, how they may be used for grading or sizing. And, either instead of, or in addition to using the mechanisms for spray-washing they may be used for tank washing, immersion or other treatment of produce. For instance the wave run of the belt may be partially or wholly submerged in a body of liquid in a tank. Such a tank is indicated schematically at $T_1$ in dotted lines in Figs. 1 and 1a, enclosing the whole mechanism. Certain kinds of produce, heavily loaded with soil and difficult to clean, require preliminary soaking to loosen the dirt; other produce may require immersion for other treatments. Such soaking or immersion may be carried on simultaneously with spraying; or two or more of the mechanisms may be used in tandem, a first one immersing the produce and delivering to a second which spray washes, etc.

Another feature of operation that may be availed of in any of the various uses of the mechanism involves an alternating or step by step operation of the belt. For instance, instead of constantly moving the belt waves forward, they may be moved intermittently, or alternately in opposite directions. As an example I show two mutilated driving gears 30a and 30b in the gear-train driving the sprocket 30. Gear 30a drives gear 30c in such a direction as to drive the whole mechanism forward; and gear 30b drives the mechanism rearward. The number of teeth on these gears 30a and 30b is, illustratively, such that the belt-waves are moved forward a certain distance and then rearward a lesser distance, and then forwardly again. The result is an intermittent forward movement, combined with alternating rearward movements. Such a movement may be desirable for several reasons. For instance, in a given length of belt and a given forward movement speed, the produce is kept for a longer time on the belt. And in a mechanism used for soaking produce in a tank, the intermittent movement, with stops or with alternations, is conducive to thorough soaking and washing. The length of each step-by-step movement may be as desired. If the alternating back movement is used, its extent will of course be such that no produce-filled depression in the belt is carried far enough back that the fruit will tend to spill out or jam up at the head end of the belt.

I claim:

1. In a mechanism of the character described, a horizontally extending flexible belt, a roll travelling forwardly lengthwise of the belt and drivingly engaging the belt, and means for causing the roll to rotate at such speed as to drive the belt rearwardly at a linear speed greater than the roll travel speed.

2. In a mechanism of the character described, a horizontally extending flexible belt, a roll travelling forwardly lengthwise of the belt and drivingly engaging the belt, and means for causing the roll to rotate at such speed as to drive the belt rearwardly at a linear speed greater than the roll travel speed, the travelling roll being a sprocket having toothed engagement with the belt, and the last mentioned means including a toothed rack and gear.

3. In a mechanism of the character described, a horizontally extending flexible belt, a roll travelling forwardly lengthwise of the belt and drivingly engaging the belt, and means for causing the roll to rotate at such speed as to drive the belt rearwardly at a linear speed greater than the roll travel speed, the travelling roll being located under the belt to support it.

4. In a mechanism of the character described, a horizontally extending flexible belt, a roll travelling forwardly lengthwise of the belt and drivingly engaging the belt, and means for causing the roll to rotate at such speed as to drive the belt rearwardly at a linear speed greater than the roll travel speed, the travelling roll being a sprocket located under the belt to support it and having toothed engagement with the belt, and the last mentioned means including a toothed rack and gear.

5. In a mechanism of the character described, a horizontally extending flexible belt, a horizontally extending traction rail, a two-diametered roll travelling lengthwise of the belt and rail, the roll engaging the rail in rolling contact at one of its diameters and engaging the belt in rolling contact at another diameter.

6. In a mechanism of the character described, a horizontally extending flexible belt, a horizontally extending traction rail, a two-diametered roll travelling lengthwise of the belt and rail, the roll engaging the rail in rolling contact at one of its diameters and engaging the belt in rolling contact at a larger diameter.

7. In a mechanism of the character described, a horizontally extending flexible belt, a horizontally extending traction rail, a two-diametered roll travelling lengthwise of and under the belt and rail, the roll engaging the rail in rolling contact at one of its diameters and engaging the belt in rolling contact at another diameter.

8. In a mechanism of the character described, a horizontally extending flexible belt provided with a flexible sprocket chain, a horizontally extending toothed rack, a two-diametered toothed roll travelling lengthwise of and under the belt and the rack, the roll meshing with the rack at its relatively smaller diameter and with the belt chain at its relatively larger diameter.

9. In a mechanism of the character described, a supporting frame, a pair of endless carrier chains having supported upper horizontally extending runs parallel to and spaced from each other, cross shafts supported on and between the carrier chains and spaced longitudinally of the chains, two-diametered rolls mounted on the cross shafts, one such roll near each end of each shaft, and each roll comprising a toothed gear of relatively small diameter and a toothed gear of relatively large diameter, a pair of toothed horizontal racks located in the frame so as to be meshed from underneath by the small diameter gears, a flexible horizontally extending belt mounted in the frame above the upper runs of the carrier chains, and said belt including a pair of flexible chains engageable from underneath by the large diameter gears.

10. In a mechanism of the character described, a horizontally extending flexible belt, means travelling forwardly under the belt to form a moving localized support for the belt, and means in association with said localized support to feed the belt rearwardly with reference to the support at a speed greater than the forward speed of the support.

11. In a mechanism of the character described, a horizontally extending flexible belt, means travelling forwardly under the belt to form a moving localized support for the belt, and means in association with said localized support to feed the belt rearwardly with reference to the support at a speed greater than the forward speed of the support, said belt having an end under which the support first enters in its travel, and means yieldingly supporting said belt end to allow movement of that end in a rearward direction.

12. In a mechanism of the character described, a horizontally extending flexible belt, means travelling forwardly under the belt to form a moving localized support for the belt, and means in association with said localized support to feed the belt rearwardly with reference to the support at a speed greater than the forward speed of the support, said belt having an end under which the support first enters in its travel, and means yieldingly supporting said belt end to allow movement of that end in a rearward direction, the remainder of the belt being free and unsupported except by said travelling localized support.

13. In a mechanism of the character described, a horizontally extending flexible belt provided with a longitudinal flexible sprocket chain at its under side, means supporting one end of the belt and its chain so as to be yieldingly movable horizontally, a horizontally moving sprocket wheel travelling under the belt in mesh with the chain and entering under the belt under said supported end, and means for rotating said sprocket to feed the chain and the belt rearwardly as the sprocket moves forwardly beneath the belt.

14. In a mechanism of the character described, a horizontally extending flexible belt provided with a longitudinal flexible sprocket chain at its under side, means supporting one end of the belt and its chain so as to be yieldingly movable horizontally, a horizontally moving sprocket wheel travelling under the belt in mesh with the chain and entering under the belt under said supported end, and means for rotating said sprocket to feed the chain and the belt rearwardly as the sprocket moves forwardly beneath the belt, said last mentioned means embodying a stationary chain-rack and a sprocket meshed therewith and rotatively connected with the belt engaging sprocket.

15. In a mechanism of the character described, a horizontally extending flexible belt provided with a longitudinal flexible sprocket chain at its under side, means supporting one end of the belt and its chain so as to be yieldingly movable horizontally, a horizontally moving sprocket wheel travelling under the belt in mesh with the chain and entering under the belt under said supported end, and means for rotating said sprocket to feed the chain and the belt rearwardly as the sprocket moves forwardly beneath the belt, said last mentioned means embodying a stationary chain-rack and a sprocket meshed therewith and rotatively connected with the belt engaging sprocket, one of said chains having a flexibly supported extension with which its corresponding sprocket first comes into contact as the belt engaging sprocket moves under said end of the belt.

16. In a mechanism of the character described, a horizontally extending flexible belt provided with a longitudinal flexible sprocket chain at its under side, means supporting one end of the belt and its chain so as to be yieldingly movable horizontally, a horizontally moving sprocket wheel travelling under the belt in mesh with the chain and entering under the belt under said supported end, and means for rotating said sprocket to feed the chain and the belt rearwardly as the sprocket moves forwardly beneath the belt, said last mentioned means embodying a stationary chain-rack and a sprocket meshed therewith and rotatively connected with the belt engaging sprocket, the rack chain having a flexibly supported extension at each end.

17. In a mechanism of the character described, a horizontally extending flexible belt, a roll travelling forwardly lengthwise of the belt and drivingly engaging the belt, and means for causing the roll to rotate at such speed as to drive the belt rearwardly at a linear speed greater than the roll travel speed, and means to drive the roll intermittently forwardly.

18. In a mechanism of the character described, a horizontally extending flexible belt, a roll travelling forwardly lengthwise of the belt and drivingly engaging the belt, and means for causing the roll to rotate at such speed as to drive the belt rearwardly at a linear speed greater than the roll travel speed, and means to drive the roll alternately forwardly and rearwardly.

19. In a mechanism of the character described, a horizontally extending flexible belt, means travelling lengthwise under the belt to form a moving localized support for the belt, and means in association with said localized support to feed the belt rearwardly with reference to the support at a speed greater than the forward speed of the support, and means to drive said localized support intermittently lengthwise of the belt.

20. In a mechanism of the character described, a horizontally extending flexible belt, means travelling lengthwise under the belt to form a moving localized support for the belt, and means in association with said localized support to feed the belt rearwardly with reference to the support at a speed greater than the forward speed of the support, and means to drive said localized support alternately in opposite directions lengthwise of the belt.

21. In a mechanism of the character described, a horizontally extending flexible belt provided with a longitudinal flexible sprocket chain at its underside, means supporting one end of the belt and its chain so as to be yieldingly movable horizontally, a horizontally moving sprocket wheel traveling under the belt in mesh with the chain and entering under the belt under said supported end, means for rotating said sprocket to feed the chain and the belt rearwardly as the sprocket moves forwardly beneath the belt, said chain having a flexibly supported extension with which said sprocket first comes into contact as the sprocket moves under said end of the belt.

22. In a mechanism of the character described, a horizontally extending flexible belt, means for creating longitudinally traveling transversely extending waves in said belt, said means comprising longitudinally spaced rolls traveling forwardly lengthwise of the belt and drivingly engaging the belt and means for causing the rolls to rotate at such speed as to drive the belt rearwardly at a linear speed greater than the roll travel speed, a pair of horizontally extending transversely spaced carrier chains, said rolls being mounted on and driven forwardly by said chains, and closure plates associated with said chains and extending across the ends of the troughs of said waves formed in said belt.

LELAND H. PLATT.